United States Patent [19]

Enning et al.

[11] Patent Number: 5,419,610
[45] Date of Patent: May 30, 1995

[54] REINFORCEMENT OF A SHEET METAL COMPONENT IN A VEHICLE BODYWORK

[75] Inventors: Norbert Enning, Denkendorf; Klaus P. Rinke, Wettstetten; Heinrich Timm, Ingolstadt, all of Germany

[73] Assignee: Audi AG, Ingolstadt, Germany

[21] Appl. No.: 50,368

[22] PCT Filed: Nov. 26, 1991

[86] PCT No.: PCT/EP91/02231
§ 371 Date: May 14, 1993
§ 102(e) Date: May 14, 1993

[87] PCT Pub. No.: WO92/11162
PCT Pub. Date: Jul. 9, 1992

[30] Foreign Application Priority Data

Dec. 20, 1990 [DE] Germany .................. 40 40 958.9

[51] Int. Cl.⁶ .............................................. B62D 25/20
[52] U.S. Cl. ..................................... 296/204; 296/30; 296/187
[58] Field of Search .................. 296/204, 30, 187; 280/801

[56] References Cited

U.S. PATENT DOCUMENTS

| | | | |
|---|---|---|---|
| 3,423,122 | 1/1969 | Wessells III | 296/204 X |
| 4,068,884 | 1/1978 | Watanabe et al. | 296/204 |
| 4,402,545 | 9/1983 | Utsunomiya et al. | 296/204 |
| 4,572,571 | 2/1986 | Malen | 296/204 X |

FOREIGN PATENT DOCUMENTS

| | | |
|---|---|---|
| 0136264 | 4/1985 | European Pat. Off. . |
| 1268439 | 5/1968 | Germany . |
| 2412506 | 9/1975 | Germany . |
| 2435768 | 2/1976 | Germany . |
| 3722490 | 2/1989 | Germany . |
| 3801337 | 8/1989 | Germany . |
| 3918280 | 12/1990 | Germany . |
| 58-136572 | 8/1982 | Japan . |
| 1197182 | 8/1989 | Japan . |

Primary Examiner—Joseph Pape
Attorney, Agent, or Firm—Jacques M. Dulin

[57] ABSTRACT

The invention relates to a reinforcement assembly for a sheet metal component in a vehicle bodywork by a second reinforcement piece formed as an extruded light metal section which is additionally secured thereto. The sheet metal component to be reinforced runs straight in a first spatial direction and is curved only in the other two spatial directions. According to the invention, the extruded light metal reinforcement piece is shaped to conformingly fit the curved surfaces of the sheet metal component. The sheet metal component and the reinforcement piece are preferably adhesively secured together. A preferred use of the invention is for reinforcing the sheet metal vehicle floor tub in the high peak stress region of the rear safety belt anchor points. The arrangement of the invention provides an effective reinforcement for heavy loads with good force transmission. The extruded section is preferably formed with a channel sized for receiving a nut portion of a nut and bolt fastener for securing additional components such as a safety belt anchor point, an automatic winding device, a tank support or the like.

6 Claims, 1 Drawing Sheet

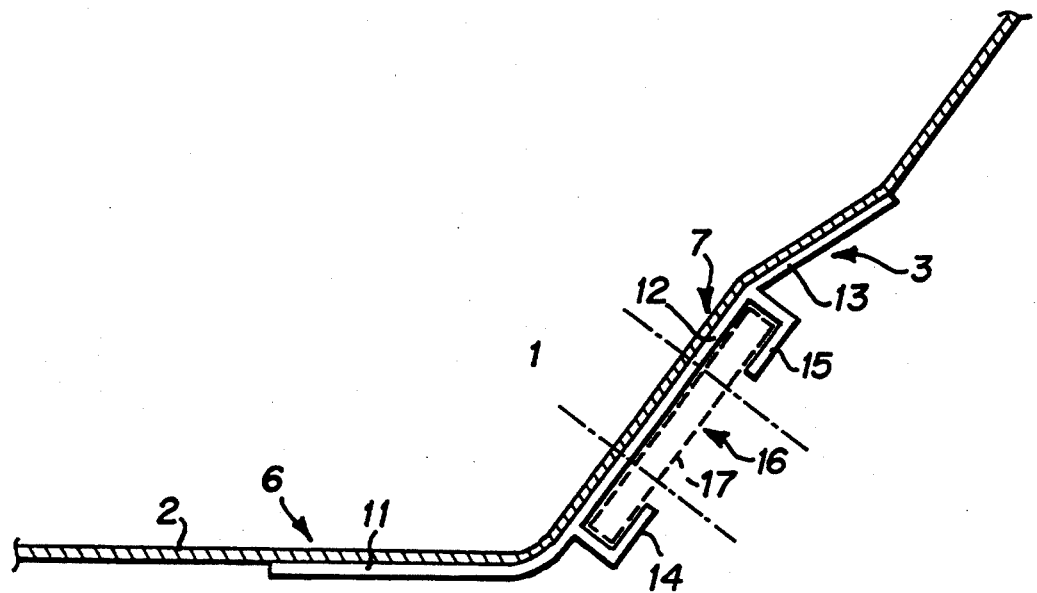
Fig_2
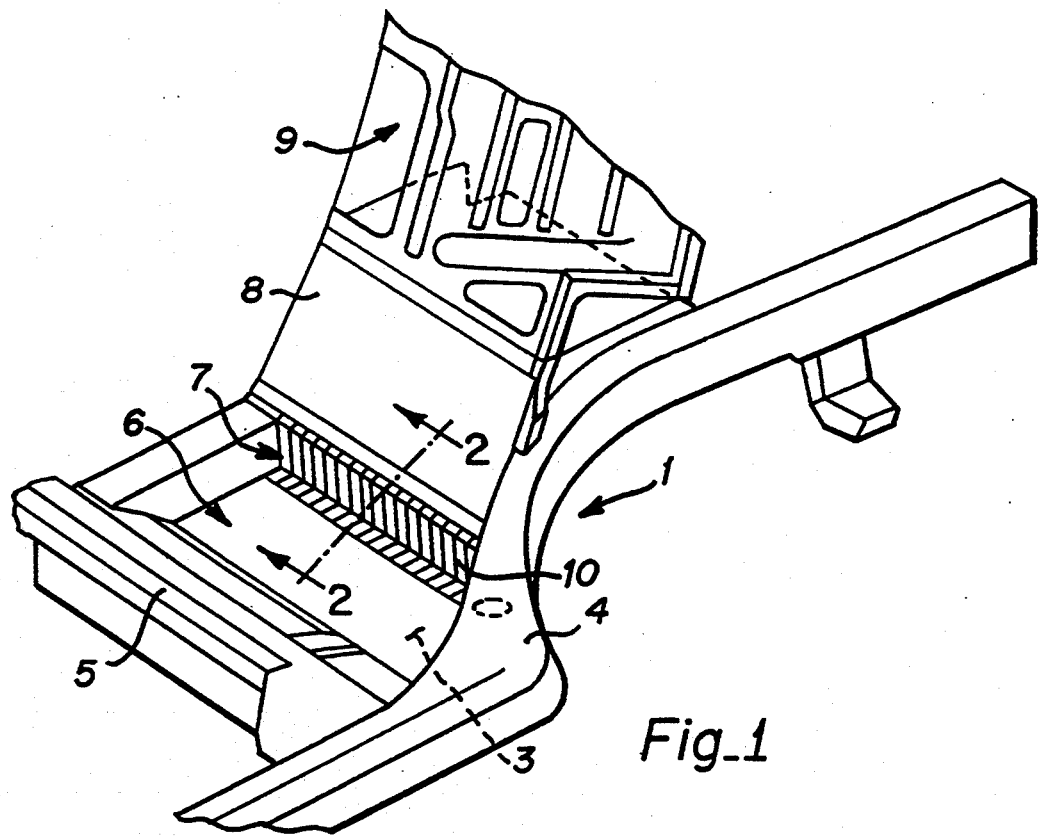
Fig_1

REINFORCEMENT OF A SHEET METAL COMPONENT IN A VEHICLE BODYWORK

FIELD

The invention relates to structural reinforcement of sheet metal components in a vehicle bodywork, and more particularly to a reinforcement assembly for the vehicle floor pan in regions of the safety belt anchor points.

BACKGROUND

In the typical motor vehicle bodywork constructed from sheet metal components, it is often necessary to reinforce the sheet metal components in regions where heavy strain occurs. It is therefore common practice to employ a so-called "sheet doubling" technique whereby one or more additional metal sheets are welded onto the bodywork at the heavy strain regions. Also, the surrounding sheets are usually provided with crimps for reinforcement.

The connection of the rear safety belt anchor assembly to the vehicle floor pan is an example region in the sheet metal vehicle bodywork where large peak stresses are known to occur under load. The safety belt anchor points lie roughly in the region where the floor pan adjoins the rear longitudinal bearer member and curves upward to meet the rear seat bulkhead. In the usual practice, the above-described sheet doubling technique is employed to provide the necessary reinforcement of the single sheet floor pan at the safety belt anchor points. Additionally, the added metal sheet may include a nut cage or nut welded thereto for use in securing the anchor mechanism of the safety belt or automatic seat belt winding device. In addition to the sheet doubling, the surrounding sheets must also be crimped for further reinforcement.

The fabrication of the reinforced safety belt anchor points as described above is costly since a large number of sheet metal components are required which, in turn, requires a large number of welding and crimping steps. Aside from the localized reinforcement for the belt anchor, no other significant improvement is achieved with regard to the rigidity or vibrational behavior of the bodywork itself in the reinforced region. Further, the additional fastening of other parts of the vehicle to the added metal sheet is not possible without further modification and additional expense.

From Japanese patent document JP-A-58 136 572 there is disclosed a reinforcement arrangement for a hollow section rear pillar of a vehicle bodywork constructed of two drawn metal sheets which are welded together. The rear pillar forms a portion of the vehicle frame boundary opening for a hatch back door and is reinforced along one interior wall portion by an additional structural piece in the region where the mounting structure for the gas cylinder door opening/closing mechanism connects to the rear pillar. The reinforcing piece is shaped to correspond to the two adjacent inner walls of the hollow section rear pillar and is positively locked against these inner walls over a length thereof. A single set of screw fasteners connect both the internal reinforcing piece to the inner walls of the hollow section and the gas cylinder mounting structure to the outer walls of the hollow section. As disclosed, this is a very specific plate doubling embodiment for stiffening a hollow section bearer member as mentioned at the outset. This document does not teach or suggest a reinforcement assembly for a floor tub in the high strain region of the rear safety belt anchor points.

Reinforcing plates and reinforcing inserts in hollow section bearer members of a vehicle bodywork are also known from German patent documents DE 2 435 768 A and DE 2 412 506 A. The placement of such reinforcing plates within the hollow section bearer members is difficult and time-consuming, due to the difficult manipulation and cramped conditions in the finished state of the bodywork.

Various solutions for adjustably connecting together sheet metal components in a vehicle bodywork are known in the art. For example, Japanese patent document JP-A-1 197 182 discloses a fender bench formed as an extruded aluminum profile in which an open supporting channel is formed by two opposite claw sections which accommodate a nut plate. Furthermore, from European patent document EP 0 136 264 83 there is disclosed a known profile rod having an open supporting channel for insertion of nut plates.

However, there is still a definite need in the art for a simple and low cost solution for the reinforcement of the vehicle floor pan in the high region of the seat belt anchor point and wherein the reinforcement also includes means for easy attachment of the seat belt anchor assembly.

THE INVENTION

OBJECTS

It is therefore an object of the present invention to provide a low cost and simple reinforcement assembly for a metal sheet portion of a vehicle floor pan in the peak stress regions of the rear safety belt anchor points and whereby additional structural pieces such as a safety belt anchor and/or an automatic winding device may be secured thereto.

It is another object of the invention to provide a reinforcement solution for a vehicle floor tub of the type described which provides additional stiffness to the surrounding portions of the reinforced region of the floor pan and which further improves the vibrational behavior of the vehicle bodywork.

It is another object of the present invention to provide a reinforcement solution for a vehicle pan of the type described which exhibits improved strength for resisting deformation in the event of a side collision to the vehicle body.

Other and further objects, features and advantages will no doubt become apparent from the following description, drawings, and appended claims.

DRAWINGS

FIG. 1 is an isometric view illustrating a reinforcement assembly for a sheet metal vehicle floor pan in the region of the rear safety belt anchor point constructed in accordance with one embodiment of the present invention.

FIG. 2 is a cross-section view taken along the line and in the direction of arrows A—A of FIG. 1.

SUMMARY

In accordance with a preferred embodiment of the present invention, the sheet metal component of the vehicle bodywork being reinforced is the portion of the sheet metal floor pan where the rear safety belt anchor points are located. An extruded section, preferably an extruded light metal section, is used as a reinforcement piece and is formed as a transverse bearer member for undergirding the floor pan region of the vehicle extending from the side rear longitudinal bearer members to approximately the middle portion of the floor pan. This arrangement provides sufficient reinforcement for the rear safety belt points when subjected to large peak stresses. The peak stresses are reduced under a favorable flow of force in view of the large area of support afforded by the transverse bearer member to the other surrounding metal sheets. The extruded section reinforcement piece (transfer bearer member) also stiffens its entire surroundings which, in turn, improves the vibrational behavior and rigidity of the vehicle body, especially in the event of a side collision. In cross-section view, the reinforcement piece has a first generally horizontal plate-like portion disposed flat against the bottom generally horizontal rear portion of the vehicle floor pan and is joined along one rearwardly disposed edge by a second middle plate-like portion which slants upward at an angle such that it conforms to the raised upward rear region of the floor pan which meets the rear bulkhead or trunk compartment.

Thus, as a rule, no crimping is necessary in the surrounding sheet metal portions of the floor pan region. Also, the multiple sheet metal components normally used in the complicated sheet doubling procedure along with the attendant welding chores are no longer needed.

It is advisable to join the extruded section reinforcement piece to the sheet metal component by an adhesive connection in order to avoid the peak stresses which may arise during welding or riveting. A weld connection is particularly undesirable since it is well known that the welding of aluminum results in a loss of strength in the zone of thermal influence. This, in turn, would give rise to a connection which is very vulnerable to cracking in the event of a collision. Such an adhesive connection is simple and inexpensive to produce in view of the large surface areas available to ensure firm adhesion.

Since it is only necessary to reinforce a rather small region of a large sheet metal component by a piece of extruded section, it is proposed that this reinforcement piece be applied directly to the heavily loaded point at the back side of the sheet metal component in the direction of loading. This arrangement provides effective absorption of a load and still exhibits a favorable flow of force.

In an advantageous embodiment of the invention, it is proposed to provide the extruded section reinforcement piece with an additional angle in the form of a third plate-like portion and a lengthwise channel to facilitate fastening of other components to the floor pan. For example, fastening components such as nut plates, seat guides, etc., can be inserted into the lengthwise channel and can be maintained in a desired position by stamping the sidewalls of the channel. Furthermore, the fastening elements may be slidably positioned along the course of the channel to provide additional flexibility and adjustment possibilities. Further still, the upstanding walls of the channel provide added strength and rigidity to the extruded section reinforcement piece.

DETAILED DESCRIPTION OF THE BEST MODE

The following detailed description illustrates the invention by way of example, not by way of limitation of the principles of the invention. This description will clearly enable one skilled in the art to make and use the invention, and describes several embodiments, adaptations, variations, alternatives and uses of the invention, including what we presently believe is the best mode of carrying out the invention.

FIG. 1 represents a partial isometric view of the bottom rear area of the bodywork of a vehicle. In this figure there is shown a rear longitudinal bearer member 4, a rear transverse seat bearer member 5, and a partial section of a floor pan 6 having an upwardly rising piece 7 which meets the bulkhead 8 of a trunk area 9.

FIG. 2 is a cross section view of a segment of the reinforcement assembly 1 taken along the line and in the direction of arrows A—A of FIG. 1. The reinforcement arrangement 1 comprises a sheet metal component 2 and an extruded section reinforcement piece 3. In this example, the sheet metal component 2 corresponds to the rear portion of the bottom horizontal floor pan region 6 of FIG. 1.

The rear anchor points for a safety belt (not shown) are normally situated in the region 10 where the rear longitudinal bearer member 4 joins the upwardly rising section 7 of the floor pan 6. Due to the large peak stresses which occur at the safety belt anchor point region 10 under loading, it is proposed to reinforce this region by the extruded section reinforcement piece 3.

As is best seen in FIG. 2, the extruded section reinforcement piece 3 lies flush against the rear and bottom end portions of the sheet metal component 2 (i.e., the rear portion of floor pan 6). The extruded section reinforcement piece 3 preferably forms a transverse bearer member extending from the outer side rear longitudinal bearer 4 towards the middle portion of the vehicle section underbody.

The extruded section reinforcement piece 3 includes a first generally horizontal plate-like portion 11 which extends rearwardly and upwardly at an angle to form a second middle portion 12 which in turn is angled downwardly slightly to emerge into a third upwardly disposed plate-like portion 13. The first generally lower horizontal plate-like section 11 conforms to the underside of the sheet metal component 2 or floor pan 6 and the middle and upper portions 12 and 13 conform to the upwardly rising contour 7 of the floor pan in the region of the rear bulkhead 8. The upper third plate-like portion 13 is bent somewhat towards the horizontal direction. The second middle section 12 includes two cage sections, 14 and 15, which form an open supporting channel 16 which preferably extends across the entire width of the second middle portion 12 in the transverse direction.

The supporting channel 16 is preferably sized sufficiently large to receive a nut plate 17 (shown in phantom) for securing the safety belt and/or for receiving a fastening means for other items such as for example, an automatic seat belt winding device or a tank.

The angled or bent configuration of the extruded section reinforcement piece 3 in combination with the channel walls 14 and 15 result in a reinforcement having great bending rigidity such that the extruded section reinforcement piece 3 acts as a transverse bearer member in the vehicle bodywork. In a preferred embodiment a transverse bearer member extends across the entire width of the vehicle body from side to side as a single piece. However, it is understood it may also be divided at a middle portion or merged into a central longitudinal bearer member. Such an transverse bearer member stiffens the surrounding portions of the vehicle bodywork, especially when provided with additional upstanding channel walls 14 and 15 and also improves the rigidity and vibrational behavior of the bodywork.

The flat plate-like portions 11, 12, 13 of the extruded section reinforcement piece 3 also provides a sufficiently large contact surface area such that peak stresses which occur under loading are reduced with a favorable flow of force. The large surface area also permits the convenient use of adhesives to positively secure the extruded section reinforcement piece 3 to the sheet metal component 2 (i.e., vehicle floor pan 6). Furthermore, the use of extruded light metal for the reinforcement piece 3 provides an extra measure of corrosion resistance to the underbody of the sheet metal bodywork. The cage sections 14 and 15 for the supporting channel 16 provide an easy means for fastening elements such as safety belt anchor points, tank supports, seat holders, and the like.

It should be understood that various modifications within the scope of this invention can be made by one of ordinary skill in the art without departing from the spirit thereof. We therefore wish our invention to be defined by the scope of the appended claims as broadly as the prior art will permit, and in view of the specification if need be.

We claim:

1. A reinforcement assembly for a sheet metal vehicle floor pan comprising in operative combination:
   a) a light metal extruded section reinforcement member configured to transversely undergird and be matingly secured to a rearwardly disposed portion of a vehicle floor pan in a region of at least one safety belt anchor point including:
   i) a first substantially horizontal plate-like portion configured to matingly engage a substantially flat bottom surface portion of said vehicle floor pan, said horizontal plate-like portion having at least one rearward edge; and
   ii) a second upwardly angled plate-like portion connected along said rearward edge of said first plate-like portion and configured to matingly engage an upwardly raised portion of said floor pan in a region where said floor pan adjoins a rear bulkhead, said second plate-like portion having at least one upper rearward edge, said second plate-like portion includes a channel, C-shaped in cross section, formed along an outward facing wall thereof, said channel having a pair of spaced apart upstanding side walls with laterally inwardly extending ends, said walls and ends defining cage sections for retaining fastening elements of other components for attachment to said floor pan.

2. A reinforcement assembly for a vehicle floor pan as in claim 1 wherein said channel has a width dimension substantially equal to a width dimension of said second plate-like portion.

3. A reinforcement assembly for a vehicle floor pan as in claim 2 wherein said extruded section reinforcement piece includes a third plate-like portion disposed adjoining said upper rearward edge of said second plate-like portion and is oriented to lay flat against an adjacent bottom contour of an upwardly raised bulkhead region of said vehicle.

4. A reinforcement assembly for a vehicle floor pan as in claim 1 wherein said extruded section reinforcement piece includes a third plate-like portion disposed adjoining said upper rearward edge of said second plate-like portion and is oriented to lay flat against an adjacent bottom contour of an upwardly raised bulkhead region of said vehicle.

5. A reinforced vehicle floor pan comprising in operative combination:
   a) a sheet metal floor pan;
   b) a light metal extruded section reinforcement member configured to transversely undergird and be matingly secured to a rearwardly disposed portion of said vehicle floor pan in a region of at least one safety belt anchor point including:
   i) a first substantially horizontal plate-like portion configured to matingly engage a substantially flat bottom surface portion of said vehicle floor pan, said horizontal plate-like portion having at least one rearward edge; and
   ii) a second upwardly angled plate-like portion connected along said rearward edge of said first plate-like portion and configured to matingly engage an upwardly raised portion of said floor pan in a region where said floor pan adjoins a rear bulkhead, said second plate-like portion having at least one upper rearward edge, said second plate-like portion includes a channel, C-shaped in cross section, formed along an outward facing wall thereof, said channel having a pair of spaced apart upstanding side walls with laterally inwardly extending ends, said walls and ends defining cage sections for retaining fastening elements of other components for attachment to said floor pan; and
   c) means for securing said reinforcement member to said floor pan.

6. A reinforcement assembly for a vehicle floor pan as in claim 5 wherein said means for securing includes an adhesively bonded joint connection.

* * * * *